US008330749B2

(12) United States Patent
Chao

(10) Patent No.: US 8,330,749 B2
(45) Date of Patent: Dec. 11, 2012

(54) METHOD AND APPARATUS FOR GENERATING CONTROL SIGNAL

(75) Inventor: Yue-Li Chao, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 739 days.

(21) Appl. No.: 12/498,379

(22) Filed: Jul. 7, 2009

(65) Prior Publication Data

US 2010/0253662 A1 Oct. 7, 2010

(30) Foreign Application Priority Data

Apr. 3, 2009 (TW) ................................ 98111224 A

(51) Int. Cl.
*G06F 3/038* (2006.01)

(52) U.S. Cl. ............................ 345/208; 348/98; 348/204

(58) Field of Classification Search .................... 345/98, 345/99, 204, 208, 213
See application file for complete search history.

(56) References Cited

U.S. PATENT DOCUMENTS 4,090,136 A * 5/1978 Magnien et al. .............. 375/249
2008/0055139 A1* 3/2008 Seo et al. ....................... 341/144

FOREIGN PATENT DOCUMENTS

TW 501087 9/2002

* cited by examiner

*Primary Examiner* — Amare Mengistu
*Assistant Examiner* — Koosha Sharifi-Tafreshi
(74) *Attorney, Agent, or Firm* — Jianq Chyun IP Office

(57) ABSTRACT

A method and an apparatus for generating a control signal are provided. This method includes following steps. First, a reset parameter is generated according to a data enable signal and a clock signal, wherein the reset parameter indicates a cycle of the data enable signal. Next, a counting value is generated according to a positive rising edge of the data enable signal and the reset parameter. Finally, a control signal is generated according to the counting value. As a result, the control signal can be continually generated to apply various techniques when variation the data enable signal is ceased.

9 Claims, 7 Drawing Sheets

METHOD AND APPARATUS FOR GENERATING CONTROL SIGNAL

CROSS-REFERENCE TO RELATED APPLICATION

This application claims the priority benefit of Taiwan application serial no. 98111224, filed Apr. 3, 2009. The entirety of the above-mentioned patent application is hereby incorporated by reference herein and made a part of this specification.

BACKGROUND OF THE INVENTION

1. Field of the Invention

The present invention relates to a method for generating a control signal. More particularly, the present invention relates to a method for generating free run control signals.

2. Description of Related Art

Driving signals of a liquid crystal display (LCD) panel mainly includes a data signal provided by a source driver and a scan signal provided by a gate driver. The data signal mainly provides a voltage signal corresponding to gray level of each pixel. The scan signal is used for controlling a switch signal input by each row of pixel voltages, and the scan signal is a progressive scan signal. In the LCD, a timing controller (TCON) has to be applied to output a control signal S to drive the source driver and the gate driver located on a panel module, so as to display a correct image. The timing controller must generate the required control signal S according to a data enable signal DE of an input image signal, and when variation of the data enable signal DE is ceased (i.e. when the data enable signal is discontinuous) generation of the control signal is also ceased because the data enable signal DE of the input image signal is not a continuous signal.

FIG. 1 is a schematic diagram illustrating a conventional technique of generating a control signal. Referring to FIG. 1, when the data enable signal DE continuously outputs square waves, the control signal S also generates the corresponding square wave along with a transition variation of the data enable signal DE. When the data enable signal DE is maintained to a low level and is no longer varied, the control signal S can only be maintained to a fixed value, and cannot generate the square wave. Therefore, driving techniques for black frame insertion and multi-domain wide viewing angle panel, etc. cannot be applied.

SUMMARY OF THE INVENTION

The present invention is directed to a method for generating a control signal, by which control signals can be continuously generated when variation of a data enable signal is ceased.

The present invention is directed to an apparatus for generating a control signal, which can generate free run control signals when variation of a data enable signal is ceased, so as to applied various driving techniques.

The present invention provides an apparatus for generating a control signal, which includes a clock signal generator, a first counter, a second counter, a register and a control signal generator. The clock signal generator is used for generating a clock signal. The first counter is used for receiving a data enable signal and a clock signal, and generating a reset parameter. The second counter is used for generating a counting value according to the reset parameter and a positive rising edge of the data enable signal. Moreover, the control signal generator is used for generating a control signal according to the counting value.

The present invention provides a method for generating a control signal. This method includes following steps. First, a reset parameter is generated according to a data enable signal and a clock signal, wherein the reset parameter indicates a cycle of the data enable signal. Next, a counting value is generated according to a positive rising edge of the data enable signal and the reset parameter. Finally, a control signal is generated according to the counting value.

In an embodiment of the present invention, the step of generating the reset parameter includes: generating a first parameter according to the data enable signal and the clock signal; generating a second parameter according to the data enable signal and the clock signal; and taking the second parameter as the reset parameter when the first parameter is equal to the second parameter.

In an embodiment of the present invention, the step of generating the counting value according to the positive rising edge of the data enable signal and the reset parameter includes: resetting the counting value when the counting value is accumulated to the reset parameter; and resetting the counting value when the positive rising edge of the data enable signal is appeared, so as to obtain the counting value according to the positive rising edge of the data enable signal and the reset parameter.

In the present invention, when variation of the data enable signal is ceased, free run control signals can be generated according to a cycle of the data enable signal, so as to apply various driving techniques.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
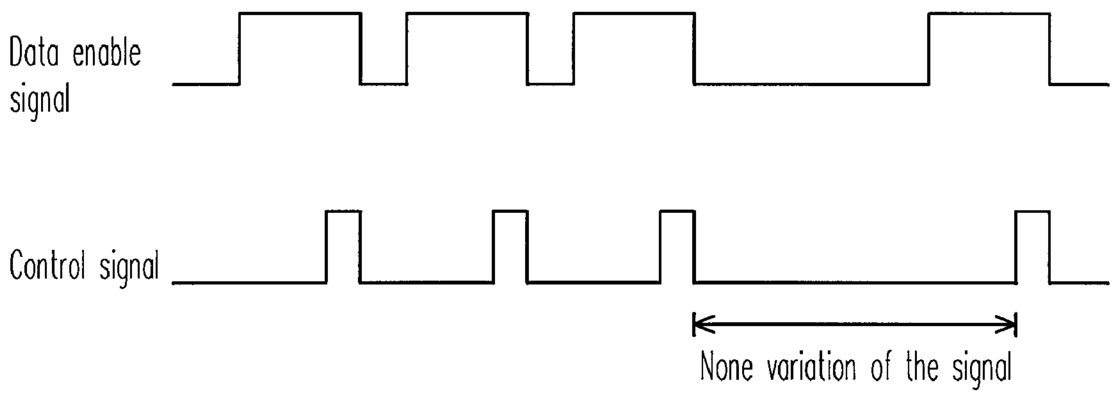
FIG. 1 (PRIOR ART)
FIG. 1 is a schematic diagram illustrating a conventional technique of generating a control signal.

According to a conventional method for generating a control signal, though the control signal can be generated according to a data enable signal of an input image signal. However, when variation of the data enable signal is ceased, generation of the control signal is also ceased, so that application of driving techniques is limited.

Accordingly, embodiments of the present invention provide a method for generating a control signal, by which the control signal is generated according to the data enable signal. When the data enable signal is normally output, the control signal is generated according to the variation of the data enable signal, and when the variation of the data enable signal is ceased, the control signal can be continuously generated according to a cycle of the data enable signal, so as to apply various driving techniques. Embodiments are described below in order to explain the present invention by referring to the figures, wherein similar reference numerals refer to similar or the same elements or steps throughout.

Figure 2:
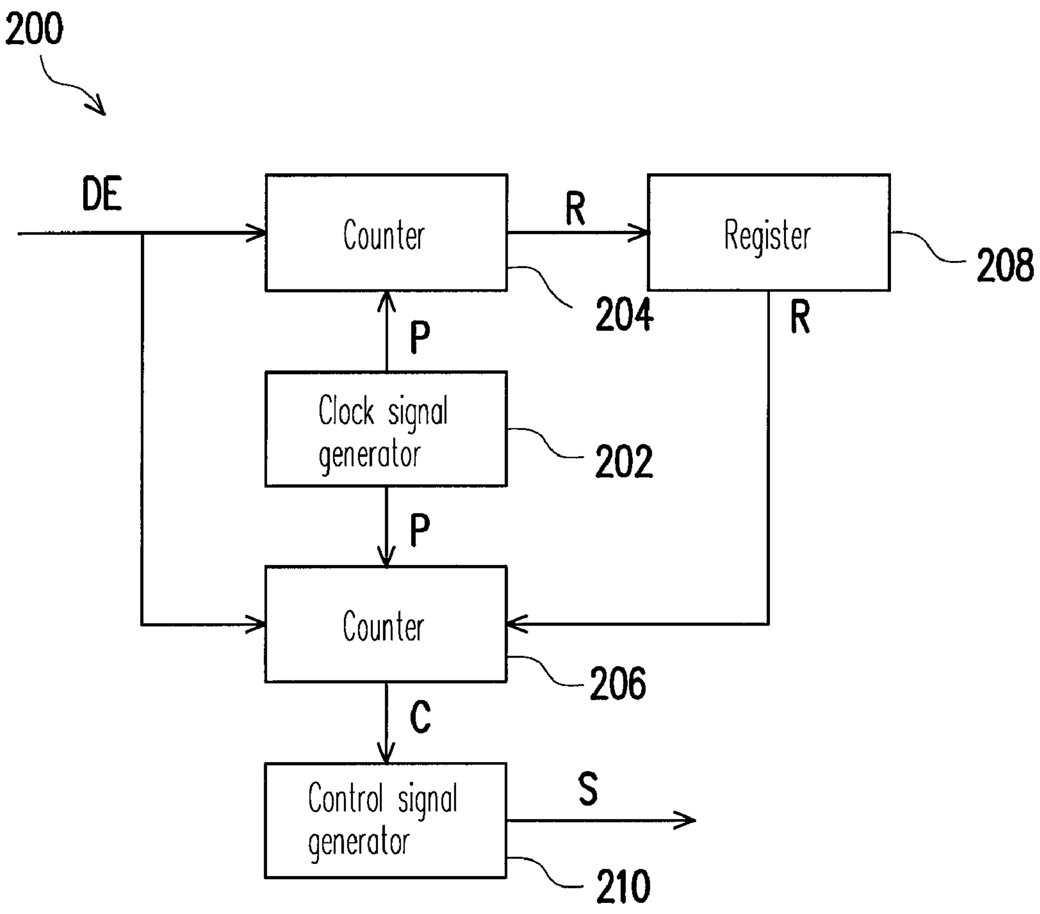
FIG. 2 is block diagram illustrating a control signal generator according to an embodiment of the present invention.

FIG. 2 is block diagram illustrating a control signal generator according to an embodiment of the present invention. Referring to FIG. 2, in the present embodiment, the control signal generator 200 includes a clock signal generator 202, a counter 204, a counter 206, a register 208 and a control signal generator 210. In the present embodiment, the clock signal generator 202 is coupled to the counter 204 and the counter 206. The register 208 is coupled to the counter 204 and the counter 206. The control signal generator 210 is coupled to the counter 206.

The clock signal generator 202 is used for generating a clock signal P. The counter 204 receives a data enable signal DE and the clock signal P for generating a reset parameter R, wherein the reset parameter R indicates a cycle of the data enable signal DE. The register 208 can store the reset parameter R generated by the counter 204. The counter 206 receives the data enable signal DE, the clock signal P and the reset parameter R, and counts a cycle number of the clock signal P, so as to generate a counting value C. Moreover, the counter 206 can also generate the counting value C according to a positive rising edge of the data enable signal DE and the reset parameter R. The control signal generator 210 receives the counting value C, and generates a control signal S according to the counting value C.

Figure 3:
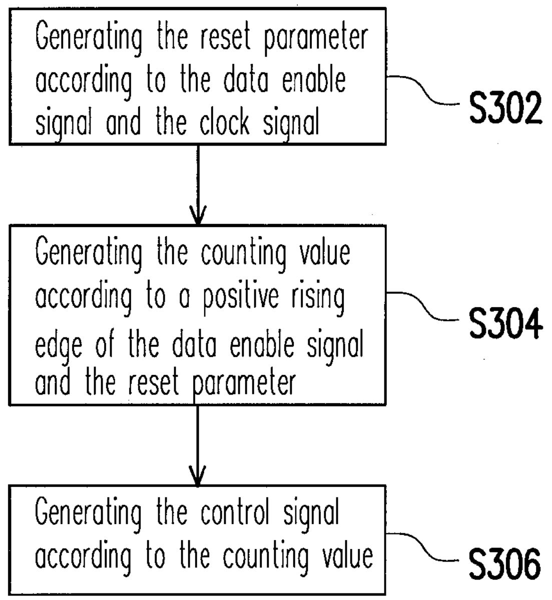
FIG. 3 is a flowchart illustrating a method for generating a control signal according to an embodiment of the present invention.

FIG. 3 is a flowchart illustrating a method for generating a control signal according to an embodiment of the present invention. Referring to FIG. 3, first, the reset parameter R is generated according to the data enable signal DE and the clock signal P (step S302). Next, the counting value C is generated according to a positive rising edge of the data enable signal DE and the reset parameter R (step S304). Finally, the control signal S is generated according to the counting value C (step S306).

Figure 4:
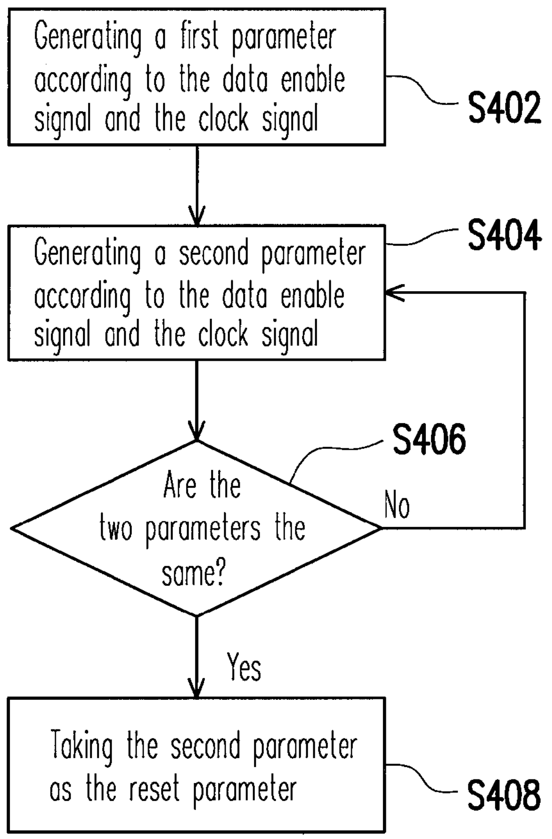
FIG. 4 is a flowchart illustrating an embodiment of a step S302.
Figure 5:
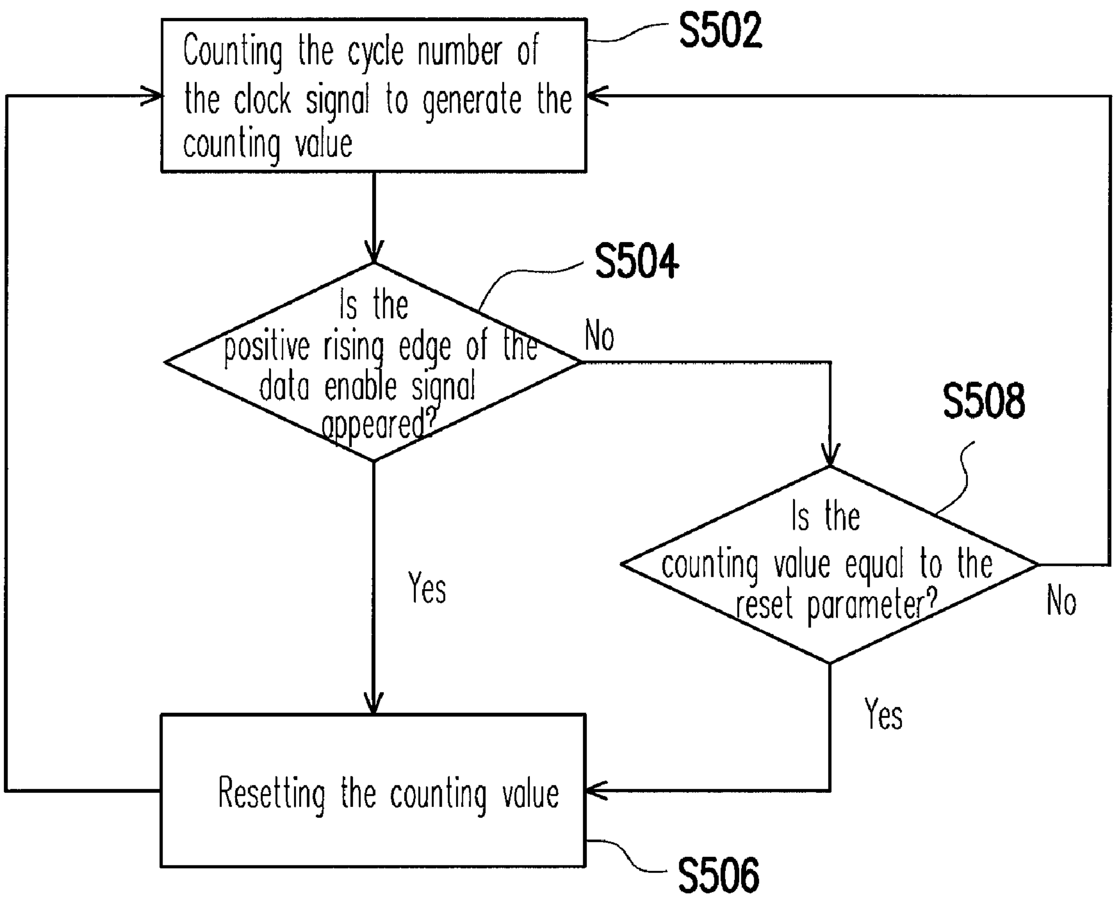
FIG. 5 is a flowchart illustrating an embodiment of a step S304.
Figure 6:
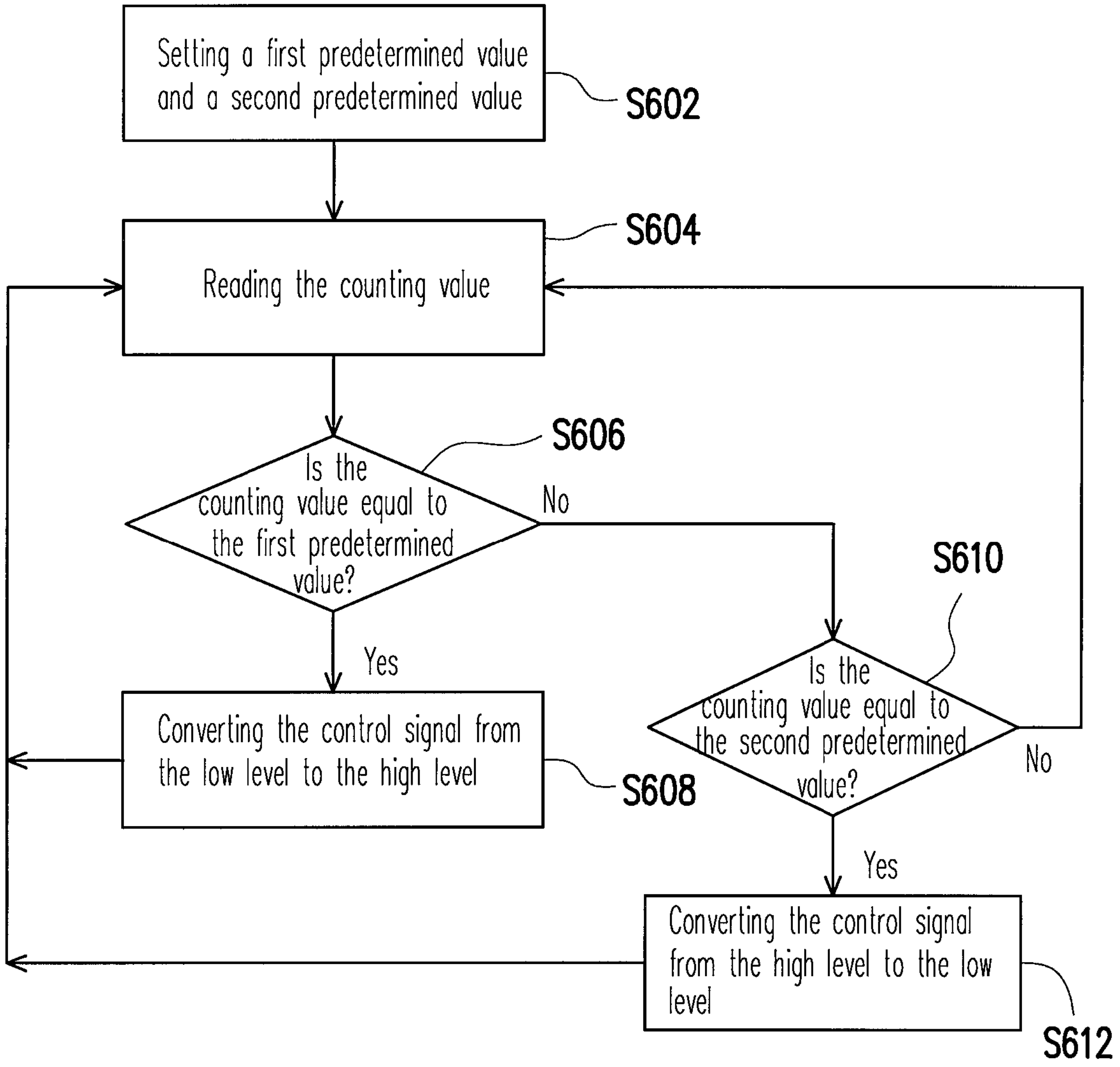
FIG. 6 is a flowchart illustrating an embodiment of a step S306.
Figure 7:
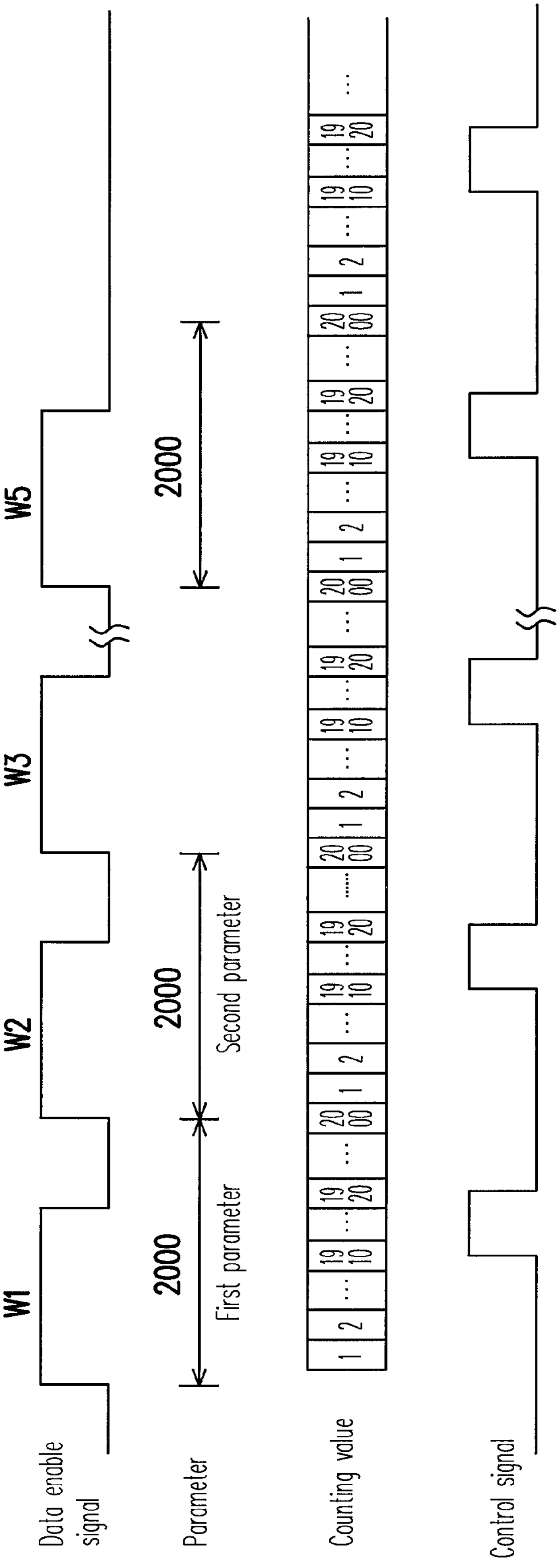
FIG. 7 is a schematic diagram illustrating a method for generating a control signal of FIGS. 4-6.

FIGS. 4-6 are flowcharts respectively illustrating embodiments of the step S302, the step S304 and the step S306. FIG. 7 is a schematic diagram illustrating a method for generating a control signal of FIGS. 4-6. To describe the steps S302-S306 in detail, FIG. 2 and FIGS. 4-7 are referenced to describe the method for generating the control signal of the present embodiment.

First, referring to FIG. 2, FIG. 4 and FIG. 7, the counter 204 receives the data enable signal DE and the clock signal P to generate a first parameter (step S402). In detail, the counter 204 receives the data enable signal DE and the clock signal P generated by the clock signal generator 202, so as to count a cycle number of the clock signal P during one cycle time of the data enable signal DE. Namely, the cycle number of the clock signal P from a positive rising edge to a next positive rising edge of the data enable signal DE is counted, so as to generate the first parameter, wherein the cycle number of the clock signal P is the first parameter.

For example, during one cycle time of the data enable signal DE of FIG. 7, i.e. from a positive rising edge of a square wave W1 to a positive rising edge of a square wave W2, the counter 204 counts the cycle number of the clock signal P to generate the first parameter. As shown in FIG. 7, the first parameter generated by the counter 204 is 2000.

Next, a second parameter is generated (step S404). In detail, after the first parameter is generated, the counter 204 continually counts the cycle number of the clock signal P during a cycle time of a next pulse signal of the data enable signal DE according to the method of the step S402, so as to generate the second parameter.

For example, during the cycle time of the next pulse signal of the data enable signal DE of FIG. 7, i.e. from the positive rising edge of the square wave W2 to a positive rising edge of a square wave W3, the counter 204 counts the cycle number of the clock signal P to generate the second parameter. As shown in FIG. 7, the second parameter generated by the counter 204 is 2000.

Next, it is determined whether the two parameters are the same (step S406). If the two parameters are the same, the second parameter is taken as the reset parameter (step S408), and if the two parameters are not the same, the step S402 is repeated to continually generate a next parameter. In detail, the counter 204 can determine whether the first parameter and the second parameter obtained according to the data enable signal DE and the clock signal P are the same, and if the first parameter is equal to the second parameter, the second parameter is taken as the reset parameter R, and the reset parameter R is transmitted to the register 208 for storage. If the first parameter is not equal to the second parameter, the step S404 is repeated, and the counter 204 continually counts the cycle number of the clock signal P during a cycle time of a next pulse signal, so as to generate a next parameter.

It should be noticed that when it is determined that the first parameter is not equal to the second parameter, the next parameter generated by the counter 204 replaces the original second parameter of the step S404. Moreover, the two parameters compared in the step S406 are the next parameter generated by the counter 204 and the original second parameter of the step S404. Therefore, the counter 204 can determine the reset parameter R according to last two continually generated parameters.

In the present embodiment, though the reset parameter R is determined according to the two continually generated first parameter and second parameter having the same value, the present invention is not limited thereto. A number of the sampled parameters can be increased according to actual requirements, so as to generate a more accurate reset parameter R. For example, referring to FIG. 7, the counter 204 continually counts five pulse signals of the square waves W1-W5, wherein the parameters of the square waves W1-W5 are all 2000. Therefore, the counter 204 can set the reset parameter R to be 2000, and transmits the reset parameter R to the register 208 for storage. The more the continually generated parameters are taken by the counter 204 to determine the reset parameter R, the closer the reset parameter R approaches the cycle of the data enable signal DE, so as to generate a more stable control signal S.

Next, referring to FIG. 2, FIG. 5 and FIG. 7, the cycle number of the clock signal P is counted to generate the counting value C (step S502) firstly. Next, it is determined whether the positive rising edge of the data enable signal DE is appeared (step S504). If the positive rising edge of the data enable signal DE is appeared, the counting value C is reset (step S506), and if the positive rising edge of the data enable signal DE is not appeared, whether the counting value C is equal to the reset parameter R is determined (step S508). If the counting value C is equal to the reset parameter R, the counting value C is reset (the step S506), and if the counting value C is not equal to the reset parameter R, the step S502 is repeated to continually count the cycle number of the clock signal P.

In detail, the counter 206 counts the cycle number of the clock signal P generated by the clock signal generator 202, so as to generate the counting value C, wherein the counting value C is the cycle number of the clock signal P. Next, the counter 206 receives the data enable signal DE, the clock signal P and the reset parameter R stored in the register 208. When the counter 206 counts the cycle number of the clock signal P, if the positive rising edge of the data enable signal DE is appeared, the counter 206 then resets the counting value C obtained by counting the cycle number of the clock signal P, and continually counts the cycle number of the clock signal P. If the positive rising edge of the data enable signal DE is not appeared, the counter 206 resets the counting value C, and continually counts the cycle number of the clock signal P when the counting value is accumulated to the reset parameter R. Therefore, by repeatedly counting the cycle number of the clock signal P through the counter 206, the counting value C generated according to the reset parameter R and the positive rising edge of the data enable signal DE is obtained.

For example, in FIG. 7, when the positive rising edge of the data enable signal DE is appeared, the counter 206 resets the counting value C to 1 for recounting because the data enable signal DE is continuously output. Moreover, if the counting value C is accumulated to the reset parameter R (with a value of 2000), the counter 206 can also reset the counting value C to 1 for recounting when variation of the data enable signal DE is ceased.

Next, referring to FIG. 2, FIG. 6 and FIG. 7, first, a first predetermined value and a second predetermined value are set (step S602). Next, the counting value C is read (step S604). Next, it is determined whether the counting value C is equal to the first predetermined value (step S606). If the counting value C is equal to the first predetermined value, the control signal S is converted from a low level to a high level (step S608), and then the step S604 is repeated, and if the counting value C is not equal to the first predetermined value, it is determined whether the counting value C is equal to the second predetermined value (step S610). If the counting value C is equal to the second predetermined value, the control signal S is converted from the high level to the low level (step S612), and then the step S604 is repeated, and if the counting value C is not equal to the second predetermined value, the step S604 is repeated.

In detail, the first predetermined value and the second predetermined value are set to the control signal generator 210, wherein the first predetermined value is less than the second predetermined value. Next, the control signal generator 210 reads the counting value C generated by the counter 206. Then, the control signal generator 210 determines whether the counting value C is equal to the first predetermined value. If the counting value C is not equal to the first predetermined value, the counter 206 then continually counts the cycle number of the clock signal P to accumulate the counting value C. If the counting value C is accumulated to the first predetermined value, the control signal generator 210 converts the control signal S from the low level to the high level, and the counter 206 continually counts the cycle number of the clock signal P to accumulate the counting value C. Thereafter, the control signal generator 210 determines whether the counting value C is equal to the second predetermined value. If the counting value C is not equal to the second predetermined value, the counter 206 continually counts the cycle number of the clock signal P to accumulate the counting value C. If the counting value C is equal to the second predetermined value, the control signal generator 210 converts the control signal S from the high level to the low level, and the counter 206 continually counts the cycle number of the clock signal P to accumulate the counting value C.

For example, referring to FIG. 7, in the present embodiment, the first predetermined value is set to 1910, and the second predetermined value is set to 1920. When the counting value C is accumulated to 1910, the control signal S is converted from the low level to the high level, and when the counting value C is accumulated to 1920, the control signal S is converted from the high level to the low level. In the present embodiment, though the corresponding varied control signal S is generated according to the first predetermined value and the second predetermined value, the present invention is not limited thereto. More predetermined values can be set according to actual requirements, or when the counting value is accumulated to a different predetermined value, a corresponding pulse signal is output to generate the control signal S that can activate a required driving technique.

Though a possible model of the method and the apparatus for generating the control signal is described in the aforementioned embodiment, those skilled in the art should understand that designs of the method and the apparatus are different for different manufacturers, so that the present invention is not limited to such possible model. In other words, when variation of the data enable signal is ceased, as long as the control signal is continually output according to the cycle of the data enable signal, it is considered to be coped with the spirit of the present invention. Embodiments are provided below for those skilled in the art for further understanding of the present invention.

Figure 8:
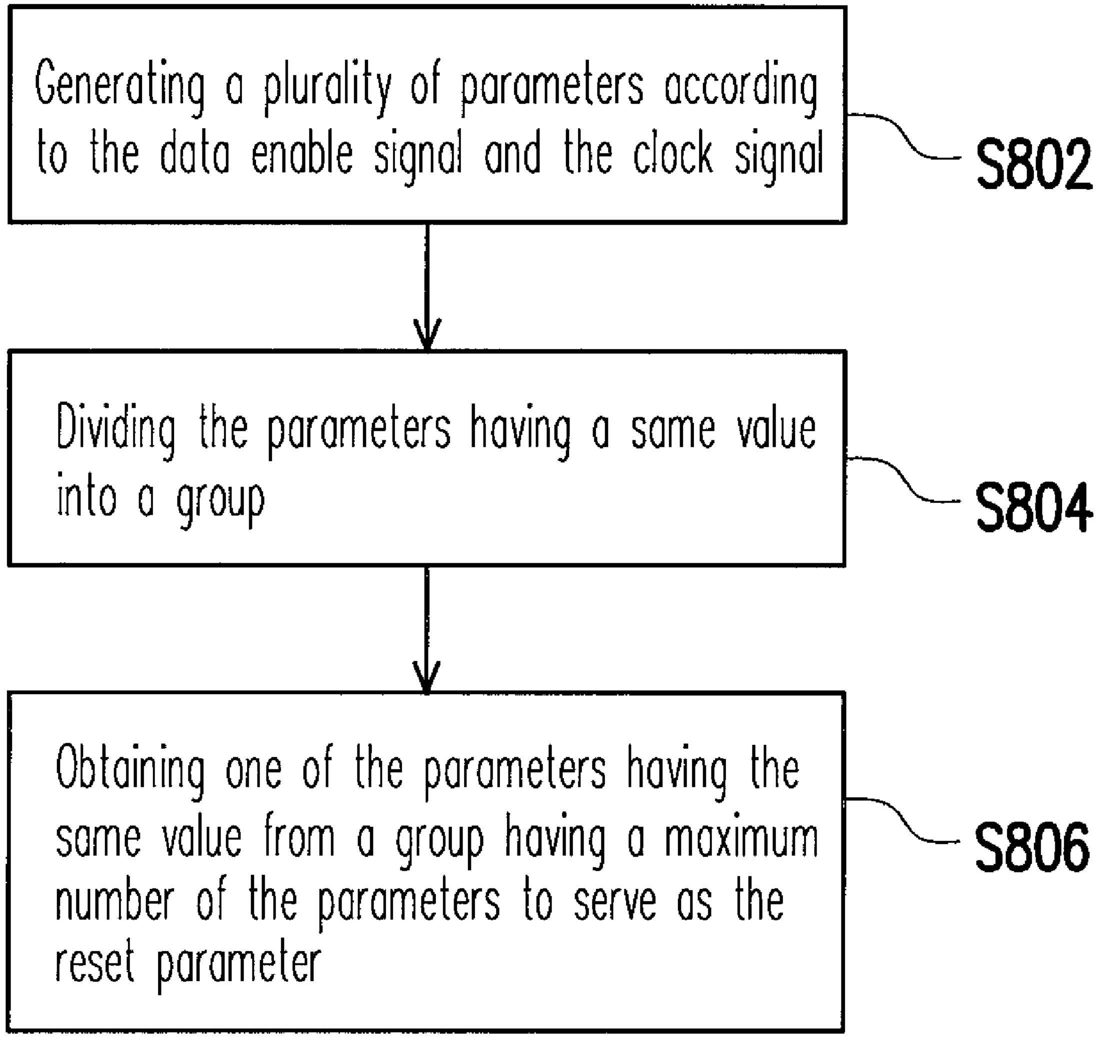
FIG. 8 is a flowchart illustrating another embodiment of a step S302.

In the aforementioned embodiments, the steps S402-S408 disclosed in FIG. 4 is only an embodiment of the step S302, and the present invention is not limited thereto. In other embodiments, the reset parameter R can be generated according to other methods through the data enable signal DE and the clock signal P (step S302). In detail, FIG. 8 is a flowchart illustrating another embodiment of the step S302. Referring to FIG. 2 and FIG. 8, the counter 204 can generate a plurality of parameters according to the data enable signal DE and the clock signal P (step S802). Next, the parameters having a same value are divided into one group (S804). Next, one of the parameters having the same value is obtained from a group having a maximum number of the parameters to serve as the reset parameter R (step S806).

Figure 9:
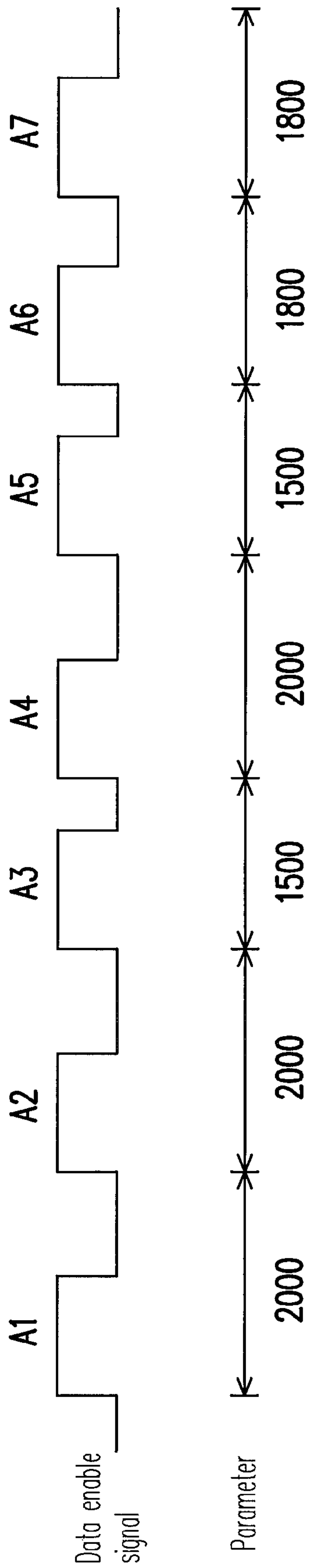
FIG. 9 is a schematic diagram of a data enable signal and parameters thereof.

For example, FIG. 9 is a schematic diagram of a data enable signal and parameters thereof. Referring to FIG. 9, 7 parameters can be generated according to square waveforms A1-A7 of the data enable signal DE firstly, wherein the parameters of the square waveforms A1, A2 and A4 are all 2000, the parameters of the square waveforms A3, and A5 are all 1500, and the parameters of the square waveforms A6, and A7 are all 1800. Then, the square waveforms A1-A7 are divided into three groups according to the values of the parameters, wherein the first group is composed of the square waveforms A1, A2 and A4, the second group is composed of the square waveforms A3 and A5, and the third group is composed of the square waveforms A6 and A7. The first group has three parameters with the same value (the square waveforms A1, A2 and A4), the second group has two parameters with the same value (the square waveforms A3, and A5), and the third group has two parameters with the same value (the square waveforms A6, and A7).

Then, the parameter of any one of the square waveforms is obtained from the group having the maximum number of the parameters (i.e. the first group) to serve as the reset parameter R. In the present embodiment, though the reset parameter R is determined according to the parameters of the square waveforms A1-A7, the present invention is not limited thereto. The more the pulse signals are sampled to determine the reset parameter R, the closer the reset parameter R approaches the cycle of the data enable signal DE, so as to generate a more stable control signal S.

In summary, when variation of the data enable signal is ceased, free run control signals can be generated according to the cycle of the data enable signal, so as to apply various driving techniques. Moreover, the embodiments of the present invention have the following advantages:

1. The more the continually generated parameters are used to determine the reset parameter, the closer the reset parameter approaches the cycle of the data enable signal, so as to generate a more stable control signal.

2. More predetermined values can be set according to actual requirements, or when the counting value is accumulated to a different predetermined value, a corresponding pulse signal is output to generate a control signal that can activate a required driving technique.

3. The more the parameters are used to determine the reset parameter, the closer the reset parameter approaches the cycle of the data enable signal, so as to generate a more stable control signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a control signal, comprising:
- generating a reset parameter according to a data enable signal and a clock signal, wherein the reset parameter indicates a cycle of the data enable signal, the step of generating the reset parameter comprising:
  - generating a first parameter according to the data enable signal and the clock signal;
  - generating a second parameter according to the data enable signal and the clock signal; and
  - taking the second parameter as the reset parameter when the first parameter is equal to the second parameter;
- generating a counting value according to a positive rising edge of the data enable signal and the reset parameter; and
- generating a control signal according to the counting value.

2. The method for generating a control signal as claimed in claim 1, wherein the step of generating the reset parameter comprises:
- generating a plurality of parameters according to the data enable signal and the clock signal;
- dividing the parameters having a same value into a group; and
- obtaining one of the parameters having the same value from a group having a maximum number of the parameters to serve as the reset parameter.

3. The method for generating a control signal as claimed in claim 1, wherein the step of generating the counting value comprises:
- counting a cycle number of the clock signal to generate the counting value.

4. The method for generating a control signal as claimed in claim 1, wherein the step of generating the counting value according to the positive rising edge of the data enable signal and the reset parameter comprises:
- resetting the counting value when the counting value is accumulated to the reset parameter; and
- resetting the counting value when the positive rising edge of the data enable signal is appeared.

5. The method for generating a control signal as claimed in claim 1, wherein the step of generating the control signal according to the counting value comprises:
- converting the control signal from a high level to a low level when the counting value is accumulated to a predetermined value.

6. The method for generating a control signal as claimed in claim 1, wherein the step of generating the control signal according to the counting value comprises:
- converting the control signal from a low level to a high level when the counting value is accumulated to a predetermined value.

7. The method for generating a control signal as claimed in claim 1, wherein the step of generating the control signal according to the counting value comprises:
- outputting a pulse signal when the counting value is accumulated to a predetermined value.

8. An apparatus for generating a control signal, comprising:
- a clock signal generator, generating a clock signal;
- a first counter, coupled to the clock signal generator, for receiving a data enable signal and a clock signal, and generating a reset parameter, wherein the reset parameter indicates a cycle of the data enable signal;
- a second counter, coupled to the clock signal generator, for generating a counting value according to the reset parameter and a positive rising edge of the data enable signal;
- a register, coupled to the first counter and the second counter, for storing the reset parameter generated by the first counter; and
- a control signal generator, coupled to the second counter, for generating a control signal according to the counting value.

9. The apparatus for generating a control signal as claimed in claim 8, wherein the counting value is a cycle number of the clock signal.

* * * * *